United States Patent
Lee et al.

(10) Patent No.: US 11,909,911 B2
(45) Date of Patent: Feb. 20, 2024

(54) SYSTEM FOR CENTRALIZED CAPTIONED TELEPHONE SERVICE

(71) Applicant: Mezmo Corporation, Buena Park, CA (US)

(72) Inventors: Sungho Lee, Fullerton, CA (US); Wonjae Cha, Yongin-si (KR); John H. Lee, Culver City, CA (US)

(73) Assignee: MEZMO CORPORATION, Buena Park, CA (US)

( * ) Notice: Subject to any disclaimer, the term of this patent is extended or adjusted under 35 U.S.C. 154(b) by 280 days.

(21) Appl. No.: 17/367,147

(22) Filed: Jul. 2, 2021

(65) Prior Publication Data

US 2023/0007121 A1    Jan. 5, 2023

(51) Int. Cl.
| | | |
|---|---|---|
| *H04M 3/42* | (2006.01) | |
| *H04M 3/22* | (2006.01) | |
| *G10L 15/26* | (2006.01) | |

(52) U.S. Cl.
CPC ......... *H04M 3/42391* (2013.01); *G10L 15/26* (2013.01); *H04M 3/2227* (2013.01); *H04M 3/42144* (2013.01); *H04M 3/42221* (2013.01); *H04M 2201/40* (2013.01)

(58) Field of Classification Search
CPC .......... H04M 3/42391; H04M 3/2227; H04M 3/42144; H04M 3/42221; H04M 2201/40; G10L 15/26
See application file for complete search history.

(56) References Cited

U.S. PATENT DOCUMENTS

| | | | | |
|---|---|---|---|---|
| 7,221,405 | B2 * | 5/2007 | Basson | H04N 21/4856 |
| | | | | 348/E5.145 |
| 7,660,398 | B2 * | 2/2010 | Engelke | H04M 15/41 |
| | | | | 379/93.07 |
| 7,881,441 | B2 * | 2/2011 | Engelke | G10L 15/26 |
| | | | | 379/90.01 |
| 8,265,671 | B2 * | 9/2012 | Gould | H04W 4/12 |
| | | | | 704/235 |

(Continued)

OTHER PUBLICATIONS

MezmoCorp, Notification of Substantive Change, https://www.fcc.gov/ecfs/document/1030903312556/1, Mar. 8, 2019.

(Continued)

*Primary Examiner* — Lisa Hashem
(74) *Attorney, Agent, or Firm* — Heedong Chae; Lucem, PC

(57) ABSTRACT

A system for centralized captioned telephone service ("C-CTS"), which includes a C-CTS system ("C-CTSS") for providing a transcription service to a user subscribed to the C-CTS during a phone call with a peer; a mobile communications device of the user which includes a first phone number assigned from a carrier of the user; a communications device of the peer which includes a second phone number; and a plurality of caption providers that communicate with the C-CTSS. The first phone number is associated with the C-CTSS and each of the caption providers provides a captioned telephone service. A carrier of the first phone number includes a voice network, a data network, and a database that stores the first phone number of the user which is subscribed to the C-CTS. The C-CTSS includes a database that stores the first phone number of the user.

16 Claims, 8 Drawing Sheets

(56) References Cited

U.S. PATENT DOCUMENTS

| | | | | |
|---|---|---|---|---|
| 8,379,801 B2* | 2/2013 | Romriell | ............... | G06F 40/232 |
| | | | | 704/235 |
| 8,526,581 B2* | 9/2013 | Charugundla | ...... | H04L 65/4015 |
| | | | | 379/142.05 |
| 9,961,196 B2* | 5/2018 | Engelke | ............ | H04M 3/42161 |
| 10,469,660 B2* | 11/2019 | Engelke | ................. | G10L 15/26 |
| 10,505,889 B2 | 12/2019 | Lew et al. | | |
| 10,878,721 B2* | 12/2020 | Engelke | ................. | H04W 4/12 |
| 11,310,368 B2 | 4/2022 | Garcia | | |
| 11,343,374 B1 | 5/2022 | Rolia et al. | | |
| 11,570,291 B1* | 1/2023 | Engelke | .............. | H04M 1/2475 |
| 2007/0106724 A1* | 5/2007 | Gorti | ................... | H04L 65/1101 |
| | | | | 709/204 |
| 2021/0218779 A1 | 7/2021 | Wu | | |
| 2021/0243298 A1* | 8/2021 | Behm | .................... | H04M 3/58 |
| 2022/0078216 A1 | 3/2022 | Khoury et al. | | |
| 2022/0086269 A1 | 3/2022 | Gao et al. | | |
| 2022/0150352 A1 | 5/2022 | Engelke et al. | | |
| 2023/0007121 A1* | 1/2023 | Lee | ................... | H04M 3/42144 |

OTHER PUBLICATIONS

MezmoCorp, InnoCaption+: Captioned Calls, App Store Descriptions(Apple App Store, Google Play Store), Jun. 30, 2020.

* cited by examiner

SYSTEM FOR CENTRALIZED CAPTIONED TELEPHONE SERVICE

FIELD OF THE INVENTION

The present invention relates to a system for centralized captioned telephone service (C-CTS), and more particularly, a system for centralized captioned telephone service (C-CTS) for serving a wireless captioning service.

BACKGROUND OF THE INVENTION

Mobile users are often assigned a cell number from a mobile carrier when purchasing a mobile cellular device. Hearing impaired users, particularly those who are deaf or are hard-of-hearing users, also have their cell phone numbers assigned by their respective mobile carriers, but such hearing-impaired users use mainly text-oriented services. Captioning services are often referred to as Telecommunications Relay Services (TRS). This type of service is much-needed for users who suffer from hearing loss, including those users who prefer to use their residual hearing, spoken language, and technology to facilitate communication. Generally, the term "hearing impairment" describes people with any degree of hearing loss (from mild to profound), and thus hearing-impaired individuals includes those who are hard-of-hearing, deaf, or deafened.

When hearing-impaired users communicate with individuals with normal hearing through text-oriented services, many of the former feel that there is a limit to the delivery of nuance and expressive content in text-oriented communication. Also, the latter sometimes feel uncomfortable with text messaging, as speech-related nuances may be missed over text.

Therefore, hearing-impaired users (hereinafter referred to as "users") join a Telecommunications Relay Service (hereinafter referred to as "TRS") to use voice calls for smooth communication with other people. In the past, a specialized captioned telephone was used, the captioned telephone being similar to that of a captioned television. The captioned telephone converts spoken words into text for the user of the captioning service to read. For the general text service employed these days, things have not changed all that much. To use a captioning service of a CTS provider provided by the TRS, a user must obtain a specific phone number from the TRS and/or install a separate captioning device with an assigned unique phone number to use the captioning service.

When a hearing-impaired subscriber (hereinafter referred to as "TRS user") uses this text service, the TRS user's cell number is the number that is displayed as the caller ID on the phone of the other party who received the text (hereinafter referred to as "peer user"), and when using voice or video call service of the TRS, the virtual number of the TRS remains as a caller ID in the phone of the peer user. That is, the peer user must have both numbers stored, and it is likely that the peer user will later confuse the two numbers when calling-back to the TRS user. To simplify the process and avoid such confusion, TRS users desire the convenience of using a single integrated number when communicating with peer users so that the peer users need only to remember one phone number for the TRS user and the TRS user can utilize services like TRS to allow them to have richer communication content. Unfortunately, current TRS providers do not support these features.

In addition, if the user is dissatisfied with the service of the CTS provider of the TRS that is currently being used and attempts to change the service, the user has the inconvenience of having to obtain an additional or new phone number from another CTS provider with a different TRS or the same TRS in order to use a different CTS service. Additionally, if the user finds a new CTS provider (within the same TRS or outside thereof), then the user may have to pay more fees to obtain additional or different hardware to use the new CTS provider's features or services. Ultimately, whenever a new phone number is issued from the CTS provider to the user, there is an inconvenience of the user having to inform the peer of a new phone number. Therefore, both the user and the peer might have to juggle a multitude of phone numbers when figuring out how to make a call to each other. Therefore, the calling process and communication between the peer and the user can be cumbersome and inefficient with all of the phone numbers that need to be kept in track by both the user and the peer.

Furthermore, with the rise of the Internet and mobile communication devices such as smart phones, tablets, PDAs, computer laptops, 2-in-1 laptops, and the like, TRS users are no longer tethered to just one location as these mobile communication devices enable users the freedom of movement to take in calls wherever there is an internet wired/wireless network nearby. However, mobile network carriers may not desire to expend resources to enable their networks to handle specialized captioning data and configure their networks to handle calls for the hearing-impaired.

Therefore, to solve the above problems, various embodiments of a system for centralized captioned telephone service are provided, as there is a need for a system that accomplishes the goal of providing a captioning service to the hearing impaired over the existing mobile network infrastructure that uses a single-number rather than the typical multi-number usage and does not require the carrier to expend extensive resources in configuring the network to provide such a service. This invention is directed to solve these problems and satisfy the long-felt need.

SUMMARY OF THE INVENTION

The present invention contrives to solve the disadvantages of the prior art. The present invention provides a system for centralized captioned telephone service.

The object of the invention is to provide a system for centralized captioned telephone service ("C-CTS"), the system including: a C-CTS system ("C-CTSS") for providing a transcription service to a user subscribed to the C-CTS during a phone call with a peer; a mobile communications device of the user which includes a first phone number assigned from a carrier of the user, wherein the first phone number is associated with the C-CTSS; a communications device of the peer which includes a second phone number; and a plurality of caption providers that communicate with the C-CTSS, wherein each of the caption providers provide a captioned telephone service. The carrier of the first phone number includes a voice network, a data network, and a database that stores the first phone number of the user which is subscribed to the C-CTS, the C-CTSS including a database that stores the first phone number of the user.

The carrier of the first phone number is configured to route a call, which originated from the first phone number and directed to the second phone number, to the C-CTSS. The call includes a call setup message from the carrier. The C-CTSS is configured to: receive a call setup message from the carrier of the first phone number; add or modify a parameter of the call setup message to a predetermined value during a call setup procedure of the call to prevent the carrier from re-routing the call to the C-CTSS; and route the call to the carrier of the first phone number.

Another object of the invention is to provide a C-CTSS for providing a transcription service to a mobile communications device of a user during a phone call between a first phone number of the user and a second phone number of a peer, the C-CTSS including: a database that stores the first phone number of the user. When the user places a call using the first phone number to the second number of the peer, the C-CTSS is configured to: receive a call setup message which is routed from the carrier of the first phone number; add or modify a parameter of the call setup message to a predetermined value during a call setup procedure of the call to prevent the carrier from re-routing the call to the C-CTSS; and route the call to the carrier of the first phone number.

The advantages of the present invention are: (1) the user can use one number without requiring the use of a separate TRS phone number; (2) the user can use one mobile communication device rather than using multiple devices at the same time (e.g. mobile communication device and the TRS phone); (3) the user can use several different caption providers for captioning that the C-CTS provides having to subscribe to caption providers individually; (4) little to no interruptions when switching the caption providers; (5) the user can call the peer's phone number directly and, if the peer's communication device has caller ID, then the user's mobile communication device phone number is displayed on the peer's communication device; (6) the peer can call to the user's mobile communication device phone number directly rather than having to call a TRS number of the user to reach the user indirectly, so the peer does not need to keep an extra phone number of the user or juggle between two phone numbers of the user; (7) using pre-existing network infrastructure by using the method provided by the carrier, so no need for expensive overhauls or upgrades to the network; (8) native application is easy to implement because only a packet path for caption/control is created; (9) users do not need to spend extra costs for the traffic; (10) on the carrier side, a simple network structure that can be re-routed to the C-CTSS based on user information provided in the calls routed to itself; and (11) on the carrier side, a separate upgrade is not required for the above re-routing function and measures to prevent double-triggering of this function is easily implemented.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
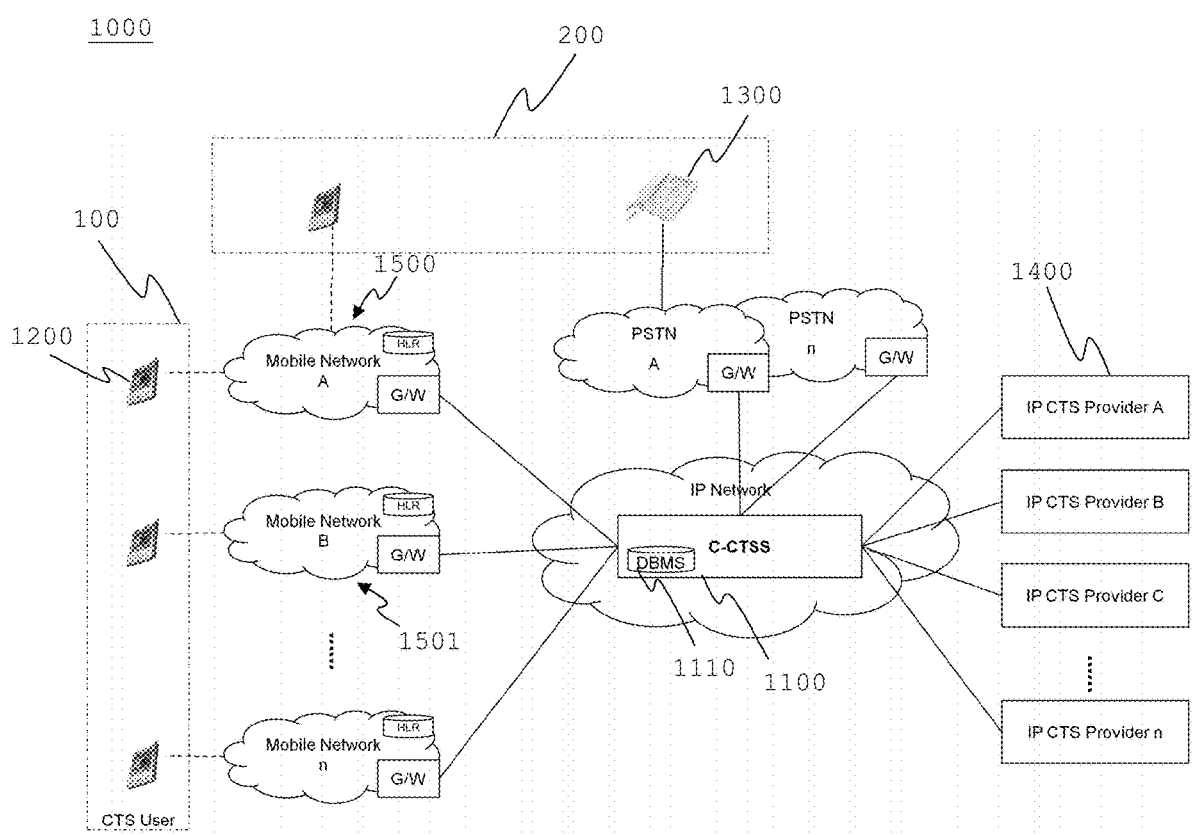
FIG. 1 is a schematic diagram of a system for centralized captioned telephone service ("C-CTS") according to embodiments of the present invention.
Figure 2:
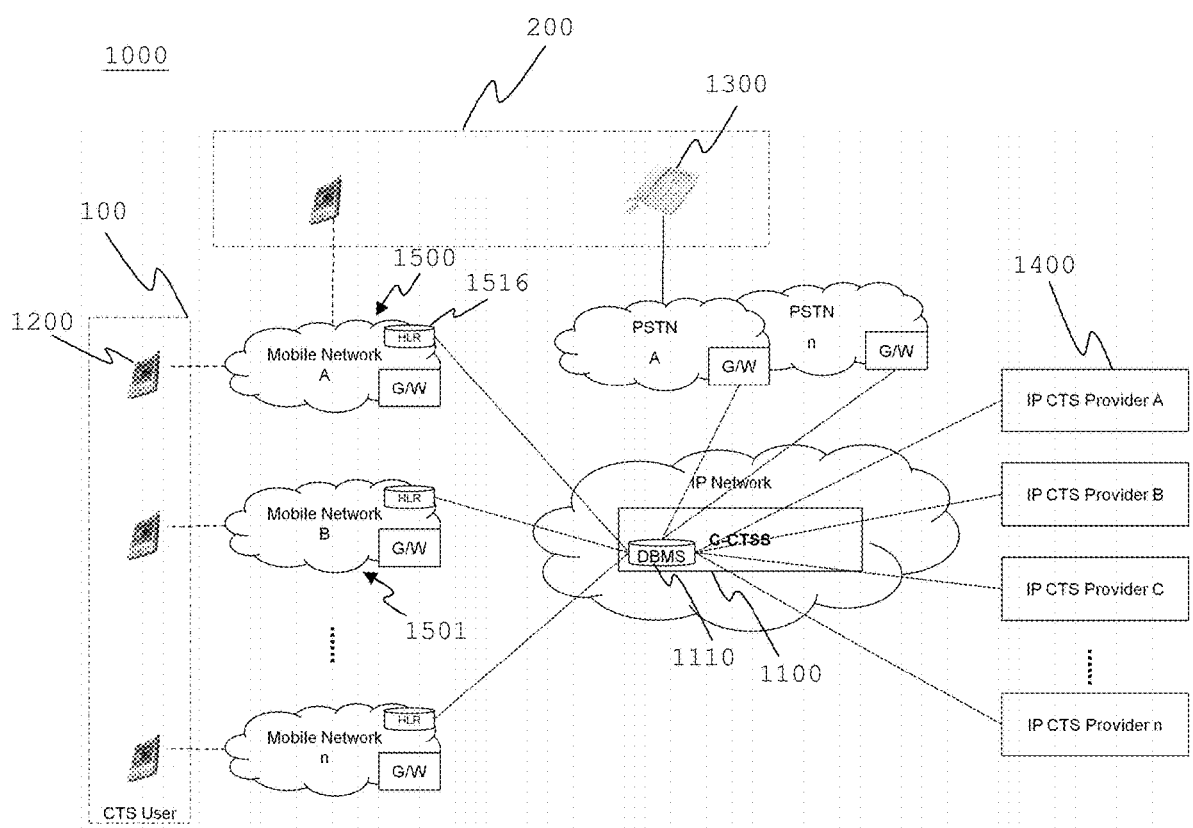
FIG. 2 is a schematic diagram of the system for C-CTS according to embodiments of the present invention.

FIGS. 1 and 2 show network diagrams for a system (1000) for centralized captioned telephone service ("C-CTS"), the system (1000) including a C-CTS system ("C-CTSS") (1100) for providing a transcription service to a user (100) subscribed to the C-CTS during a phone call with a peer (200); a mobile communications device (1200) of the user (100) which includes a first phone number (301) assigned from a carrier (1500) of the user (100), wherein the first phone number (301) is associated with the C-CTSS (1100); a communications device (1300) of the peer (200) which includes a second phone number (302); and a plurality of caption providers (1400) that communicate with the C-CTSS (1100), wherein each of the caption providers (1400) provide a captioned telephone services. A carrier (1500) operates a mobile network (1510) for the first phone number (301), the mobile network (1510) including a voice network (1512), a data network (1514), and a database (1516) that stores the first phone number (301) of the user (100) who is subscribed to the C-CTS. The mobile network (1510) allows the mobile communications device (1200) to wirelessly communicate with other communication devices whether the communication devices are similarly wireless as the mobile communications device (1200) of the user (100) or are landline communication devices as shown.

As shown in FIGS. 1 and 2, the C-CTSS (1100) includes a database (1110) that stores the first phone number (301) of the user (100). FIG. 1 shows a network diagram of how the C-CTSS (1100) is physically connected to various components of the system (1000). For example, the C-CTSS (1100) is communicative with the mobile network (1510) of the carrier (1500) and the public switched telephonic network (PSTN) through their respective gateways (G/W). Additionally, as shown, the C-CTSS (1100) is communicative with the plurality of caption providers (1400). FIG. 2 shows a network diagram of the logical connections for the C-CTSS (1100) database (1110), particularly how the database (1110) uses information from the database (1516) of a home location register (HLR) to establish a logical connection with the mobile networks of different carriers.

Figure 3:
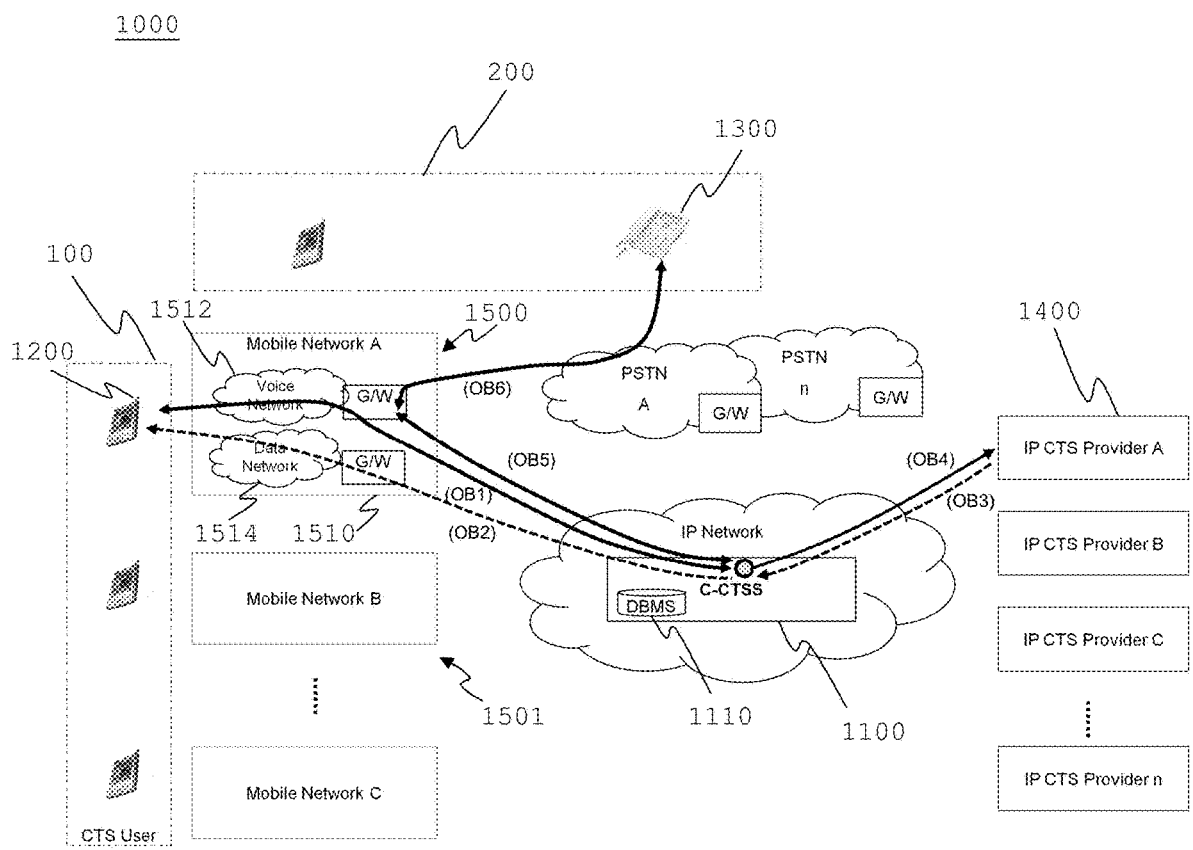
FIG. 3 is a schematic diagram of the system handling an outbound call according to embodiments of the present invention

As shown in FIG. 3, the carrier (1500) of the first phone number (301) is configured to route a call through the G/W of the carrier (1500), the call originating from the first phone number (301) and directed to the second phone number (302), to the C-CTSS (1100). Also shown in FIG. 3, the signaling/voice traffic is routed from the mobile network (1510) to the C-CTSS (1100) as indicated by OB1. Accordingly, the C-CTSS (1100) is configured to: receive the call setup message from the carrier (1500); add or modify a call setup message parameter during the call to a predetermined value to prevent the carrier (1500) from re-routing the call to the C-CTSS (1100); and route the call setup message to the carrier (1500). Upon receiving the call setup message from the C-CTSS (1100) and checking the added or modified parameter, the carrier (1500) of the first phone number (301) routes the call to the carrier of the communications device (1300) of the second phone number (302) as indicated by OB6 (here, the second phone number (302) of a communications device (1300) that is connected to the PSTN).

As shown in FIG. 3, a user's caption provider (1400) from the plurality of caption providers (1400) communicates with the C-CTSS (1100) to provide the captioned telephone service of the user's caption provider (1400) to the user (100). To view the caption information provided from the user's caption provider (1400), the mobile communications device (1200) of the user (100) includes a display. For internet communication, the mobile network (1510) further includes a network interface. As shown in FIGS. 3, the C-CTSS (1100) is further configured to transfer a voice of the peer (200) received from the communication device of the peer (200) to the user's caption provider (1400) as indicated by OB4 and transfer a captioned data of the voice of the peer (200) received from the user's caption provider (1400) to the mobile communications device (1200) of the user (100) as indicated by OB2. The setup sequence for the outbound call from the user (100) of the C-CTS (e.g. a C-CTS subscriber) to the C-CTS with the voice traffic from the peer (200) is OB1→OB2→OB3/4→OB5→OB6, or OB1→OB2→OB5→OB6→OB3/4, wherein OB2 and OB3 represents data paths related to the caption data. This setup sequence is the same if the data network (1514) of the mobile network (1510) is used instead of the voice network (1512) of the mobile network (1510) as shown in FIG. 4.

When the peer (200) is subscribed to the C-CTS, the second phone number (302) is stored in the database (1110) of the C-CTSS (1100). A peer's caption provider (1400) from the plurality of caption providers communicates with the C-CTSS (1100) to provide the captioned telephone service of the peer's caption provider (1400) to the peer. For the peer (200) C-CTS subscriber, the C-CTSS (1100) is further configured to transfer a voice of the user (100) received from the mobile communications device (1200) of the user (100) to the peer's caption provider (1400) and transfer a captioned data of the voice of the user (100) received from the peer's caption provider (1400) to the communication device (1300) of the peer (200). If the user (100) and the peer (200) use the same carrier (1500), then the connection between the carrier (1500) and the C-CTSS (1100), and the connection between the C-CTSS (1100) and the caption provider may be a single connection if the user (100) and the peer (200) use the same caption provider (1400) or multiple connections if the user (100) and the peer (200) use different caption providers (see the plurality of caption providers (1400) that be offered by the C-CTS via the C-CTSS (1100)).

Figure 4:
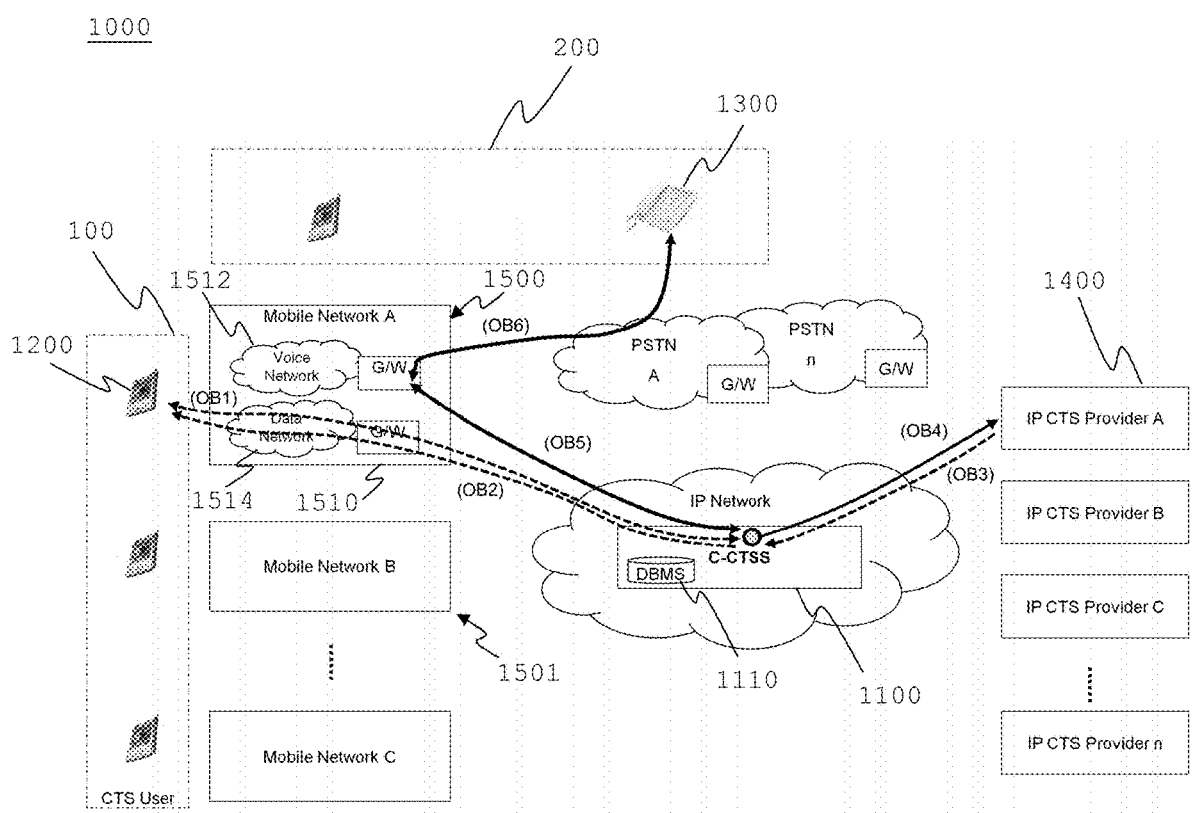
FIG. 4 is a schematic diagram of the system handling an outbound call according to embodiments of the present invention.
Figure 5:
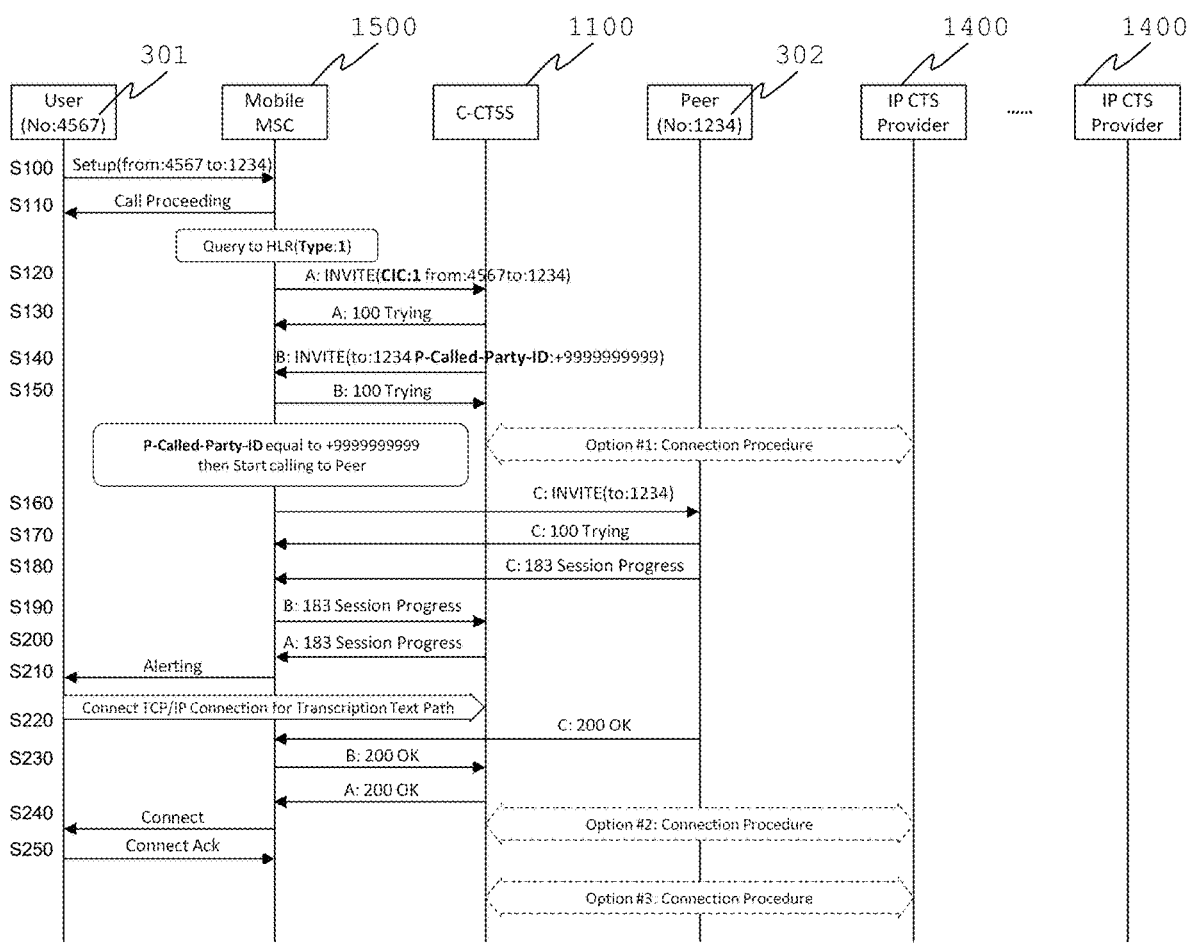
FIG. 5 is a schematic flowchart of the system handling an outbound call according to embodiments of the present invention.

FIG. 5 illustrates an outbound call within the system (1000) as shown in FIGS. 3-4 in greater detail. The connection procedure between user (100) and mobile MSC (mobile switching center) (1500) can use the UNI (user-network interface) protocol such as Q.931, Q.2931, SIP, and the like. In S100, the user (100) of the C-CTS having the first phone number (301) of 4567 (for simplicity, the typical 10-digit length for a phone number is truncated here) uses their mobile communications device (1200) to call to the peer (200) having the second phone number (302) of 1234. Accordingly, the originating call is from the mobile communications device (1200) of the user (100) having the first phone number (301), thus the first phone number (301) here is a calling party number and the second phone number (302) here is a called party number. S100 initiates the setup procedure between the user's caption provider (1400) and the carrier (1500) of the user (100) of the originating call. Once the setup procedure is established between the user's caption provider (1400) and the carrier (1500) of the user (100), the call may proceed as shown in S110. In S120, the carrier (1500) must check to see if the user (100) of the originating call is a C-CTS subscriber. The carrier (1500) queries the HLR to obtain user (100) information to determine whether the user (100) information contained in the HLR is set to a value that confirms that the user (100) is a C-CTS subscriber. "Type:1" may indicate only that the calling party number is a C-CTS subscriber, here the user (100). "Type:2" may indicate that only the called party number is a C-CTS subscriber, here the peer (200). "Type:3" may indicate that both the calling party and called party numbers are found to be C-CTS subscribers; this applies when both of the calling party and called party numbers use the same carrier (1500), and both of the calling party and called party numbers are connected to the caption provider (s) (1400) of the C-CTS. "Type:3" may also apply when the calling party number and the called party number use different carriers (1500, 1501), and both of the calling party and the called party numbers are connected to the caption provider(s) of the C-CTS; the user (100) and the peer (200) may use the same caption provider (1400) or different caption providers (1400).

Here, the identification code for a C-CTS subscriber is set to "Type:1" which confirms that the user (100) of the first phone number (301), the calling party number here, that is making the call to the second phone number (302) is a C-CTS subscriber that needs captioning service during the call session. If the user (100) is not a subscriber to the C-CTS, then the carrier (1500) does not route the call to the C-CTS. If the user (100) is a C-CTS subscriber, then in S120 the carrier (1500) routes the call to C-CTSS (1100) with an "INVITE" message having at least "from:4567 to:1234" information in the message. Additionally, in this example, the Carrier Identification Code (CIC) parameter in IAM of ISUP protocol of the "INVITE" message is included in the INVITE message and the CIC is set to 1. The CIC is used by the C-CTSS (1100) in a similar manner as the carrier (1500), so there any changes between how the C-CTSS (1100) and carrier (1500) handles this parameter is minimal.

However, with the system (1000), it is possible to define and use a parameter that is not in use or a new parameter when implementing the CIC.

During S130, the C-CTSS (1100) transmits a "100 TRYING" message to the carrier (1500). Additionally, the C-CTSS (1100) makes an "INVITE" message to the carrier (1500) having a "P-Called-Party-ID" in the header of INVITE message. The "P-Called-Party-ID" that modified a parameter to a predetermined value to prevent the carrier (1500) from re-routing the call to the C-CTSS (1100) (during S140 for this example, the "P-Called-Party-ID is set to "+999999999"; any other predetermined value may be used). During S150, the carrier (1500) sends a "100 TRYING" message to the C-CTSS (1100). Once the P-Called-Party-ID is set to the predetermined value, the carrier (1500) can start calling and attempt to connect to the peer (200) on the called party number (302). At this time, C-CTSS (1100) can start a connection setup for voice and data with the selected caption provider (1400). This connection procedure can use the UNI (user-network interface) protocol or a propriety protocol such as Q.931, Q.2931, SIP, and the like. The connection procedure sets the path to transmit the voice information to the peer (200). The connection between the C-CTSS (1100) and the caption provider (1400) of the C-CTS can be connected/disconnected at any time and at any point by the user (100) through the TCP/IP connection between the user (100) and the C-CTSS (1100), the connection thereof being mediated by the C-CTSS (1100) as shown in FIGS. 3-4.

In the call setup procedure (S160-S180) the carrier (1500) attempts to establish a connection between the user (100) of the first phone number (301) and the peer (200) of the second phone number (302). After the call setup procedure (S160-S180) is completed, the carrier (1500) sends a "B: 183 Session Progress" message to the C-CTSS (1100) in S190, this message may include ACM of the ISUP protocol. When the C-CTSS (1100) receives a "ring back tone" through the signaling/voice traffic paths (OB5, OB6), the C-CTSS (1100) sends data pertaining to the ring back tone to the caption provider (1400) and the user (100). When the captioning agent of the caption provider (1400) hears the ring back tone, the captioning agent sends texts (e.g. "RING") to the C-CTSS (1100) through the TCP/IP connection and then the C-CTSS (1100) transmits the received texts to the carrier (1500) to send to the user's (100) mobile communications device (1200) via the carrier (1500)'s data network (1514) and through the captioning data path (OB2) shown in FIGS. 3 and 4. In S200, the C-CTSS (1100) transmits a "183 Session Progress" message to the carrier (1500). Alert messages may be passed from the carrier (1500) to the user's (100) mobile communications device (1200) in S210 and "200 OK" messages may be passed between the carrier (1500) and the C-CTSS (1100) during the call sessions when the captioning service from the caption provider (1400) is active as seen in S230.

Figure 6:
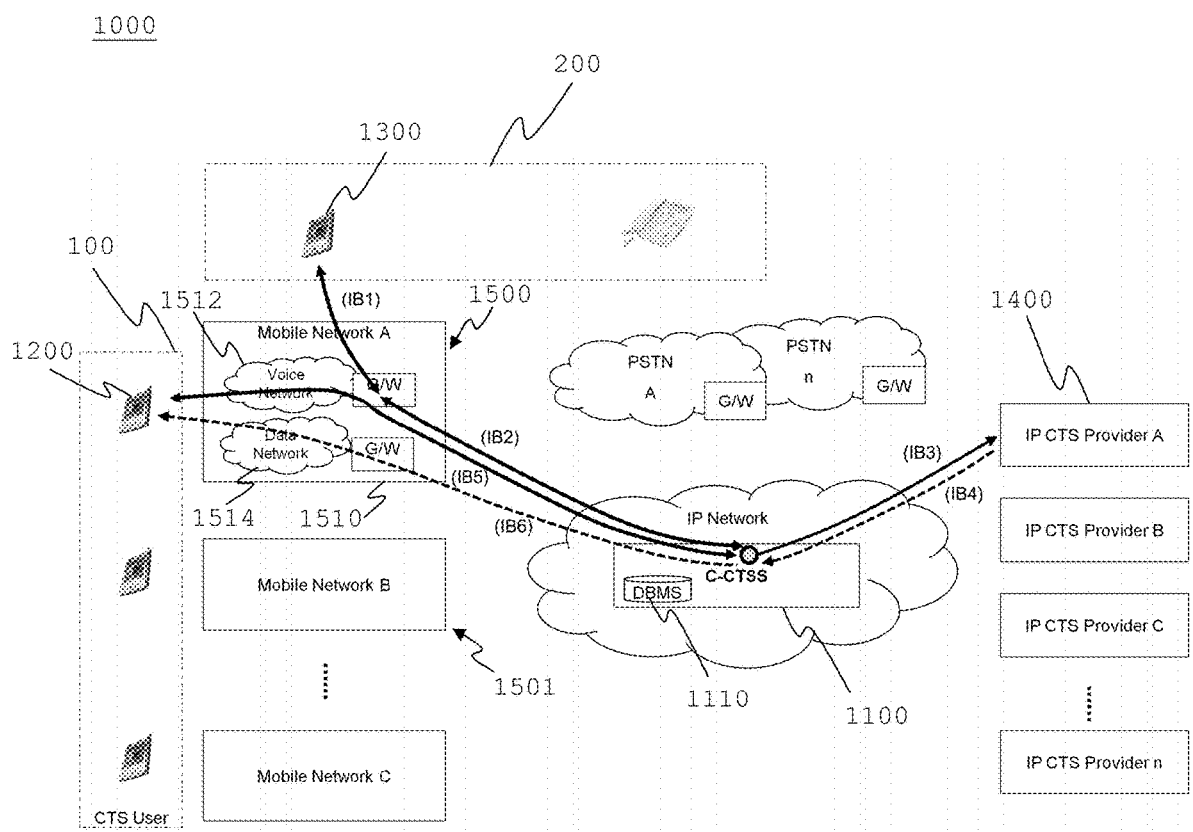
FIG. 6 is a schematic diagram of the system handling an inbound call according to embodiments of the present invention.

As shown in FIG. 6, the peer (200) having a second number (302) places a return call directed to the first phone number (301) of the user (100) using the communications device (1300) of the peer (200), which is an inbound call from the perspective of the user (100) of the first phone number (301). The communications device (1300) of the peer (200) is connected to the carrier (1500) of the first phone number (301) and upon checking the first phone number (301), the carrier (1500) of the first phone number (301) is configured to route the return call to the C-CTSS (1100), where the C-CTSS (1100) is further configured to: receive a return call setup message from the carrier (1500) of the first phone number (301); add or modify a return call setup message parameter; and route the return call to the carrier (1500). Upon receiving the return call setup message from the C-CTSS (1100) and checking the added or modified the return call setup message parameter of the first phone number (301), the carrier (1500) of the first phone number (301) routes the return call setup message to mobile communications device (1200) of the first phone number (301).

Figure 7:
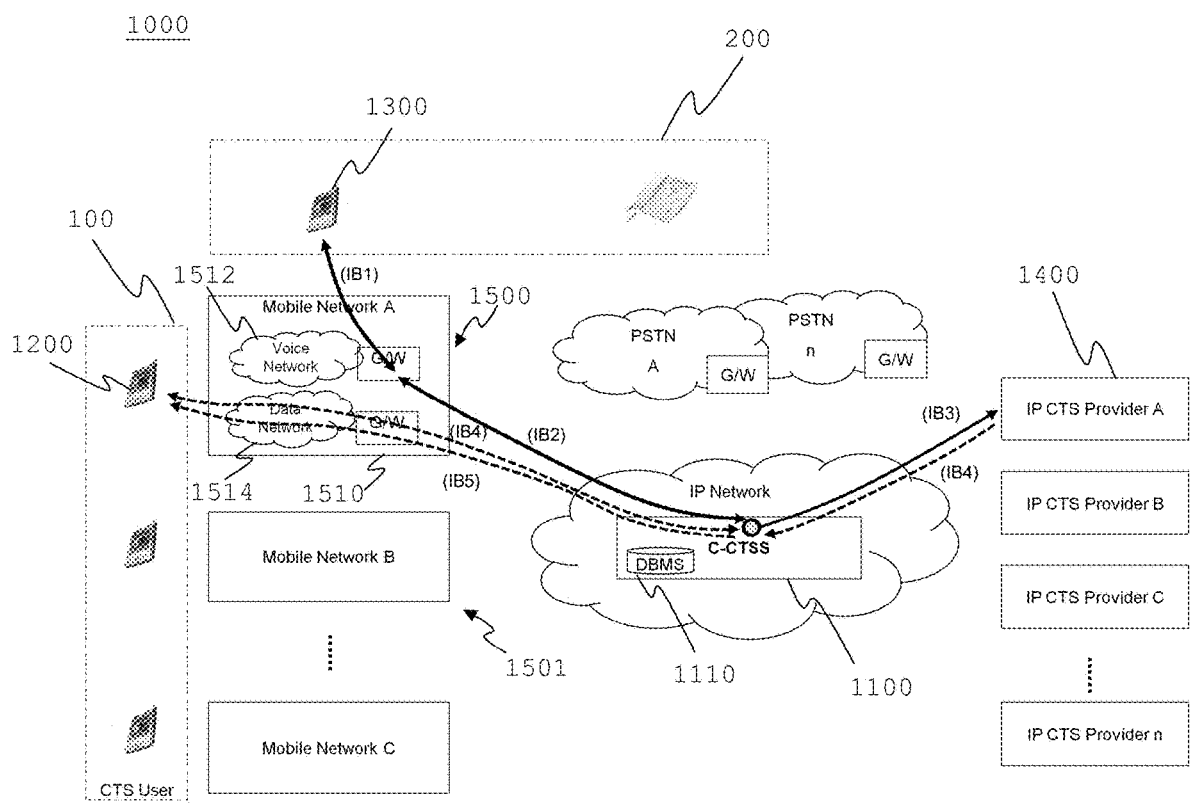
FIG. 7 is a schematic diagram of the system handling an inbound call according to embodiments of the present invention.

For this inbound call, FIG. 6 shows how a user's caption provider (1400) from the plurality of caption providers (1400) communicates with the C-CTSS (1100) to provide the captioned telephone service of the user's caption provider (1400) to the user (100). Furthermore, the C-CTSS (1100) is further configured to transfer a voice of the peer (200) received from the communication device of the peer (200) to the user's caption provider (1400) and transfer a captioned data of the voice of the peer (200) received from the user's caption provider (1400) to the mobile communications device (1200) of the user (100). Additionally, the C-CTSS (1100) is further configured to connect to the user's caption provider (1400) via an internet protocol network, and connect to the mobile communications device (1200) of the user (100) via the data network (1514). FIG. 6 illustrates the setup sequence to establish captioning service to the user (100) of the C-CTS for this inbound call, which is IB1→IB2→IB3/4→IB5→IB6, or IB1→IB2→IB5→IB6→IB3/4. This setup sequence is the same if the data network (1514) of the mobile network (1510) is used instead of the voice network (1512) of the mobile network (1510) as shown in FIG. 7.

Figure 8:
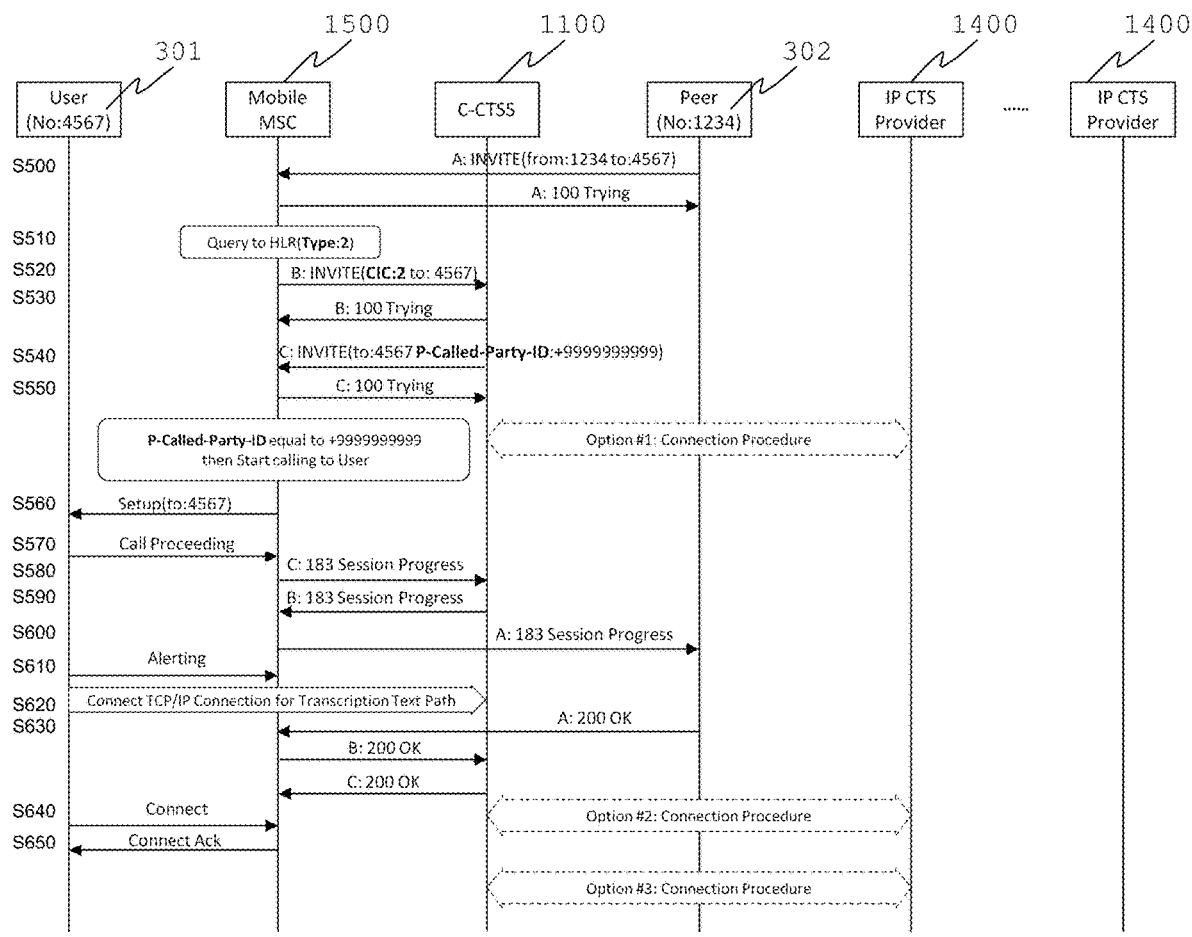
FIG. 8 is a schematic flowchart of the system handling an inbound call according to embodiments of the present invention.

FIG. 8 illustrates the inbound call within the system (1000) in greater detail. More specifically, the peer (200) having the second phone number (302) calling the user (100) having the first phone number (301), where the user (100) is a subscriber to the C-CTS. Accordingly, here the first phone number (301) of the user (100) is a called party number and the second phone number (302) of the peer (200) is a calling party number. During S500, the peer (200) having the second phone number (302) of 1234 (for simplicity, as in above, the typical 10-digit length for a phone number is truncated here) uses their communications device (1300) (mobile or non-mobile) to call the user (100) on the user's (100) mobile communications device (1200) using the user's (100) first phone number (301) of 4567. The originating call in this example is from the communications device (1300) of the peer (200) having the second phone number (302). In S500, the peer (200) attempts to call the user (100) by sending an "INVITE" message (from:1234 to:4567) to the carrier (1500) of the user (100). The carrier (1500) replies back with a "100 TRYING" message. In S510, the carrier (1500) must check to see if the second phone number (302) of the peer (200) (and of the originating call) or the first phone number (301) of the user (100) is a C-CTS subscriber. The carrier (1500) queries its HLR to determine whether the information contained in the HLR of the first and second phone numbers (301, 302) corresponds to that of a C-CTS subscriber (see FIG. 1). Again, "Type:1" value may indicate that only the calling party number is a C-CTS subscriber, here the peer (200). "Type:2" may indicate that only the called party is a C-CTS subscriber, here the user (100). "Type:3" may indicate that both calling and called party numbers are C-CTS subscribers; this applies when the parties of the calling party number and the called party number use the same carrier (1500), and both of the calling and called party numbers are connected to the caption provider(s) (1400) of the C-CTS. "Type:3" may also apply when the parties of the calling and called party numbers use different carriers (1500, 1501), and both of the calling and called party numbers are connected to the caption provider (s) of the C-CTS; the user (100) and the peer (200) may use the same caption provider (1400) or different caption providers (1400).

Here, the identification code for a C-CTS subscriber is set to "Type:2," which confirms that the user (100) of the first phone number (301)—the called party number that receives the call from calling party number (i.e. the second phone number (302))—is a C-CTS subscriber that needs captioning service during the call session. If the user (100) is not a subscriber to the C-CTS, then the carrier (1500) does not route the call to the C-CTSS (1100) of the C-CTS. If the user (100) is a C-CTS subscriber, then the carrier (1500) routes (S520) the call to the C-CTSS (1100) with an "INVITE" message having at least "from:1234 CIC:2 to:4567" information in the message as shown in S520. As shown in this example, the CIC parameter in IAM of ISUP protocol of the "INVITE" message is included in the INVITE message and the CIC is set to 2. The CIC is used by the C-CTSS (1100) in a similar manner as the carrier (1500), so any changes between how the C-CTSS (1100) and carrier (1500) handles this parameter will be minimal. However, with the system (1000), it is possible to define and use a parameter that is not in use or a new parameter when implementing the CIC.

During S530, the C-CTSS (1100) transmits a "100 TRYING" message to the carrier (1500). Additionally, the C-CTSS (1100) sends an "INVITE" message to the carrier (1500) having a "P-Called-Party-ID" in the header of INVITE message. The "P-Called-Party-ID" is the C-CTSS (1100) modification of the call parameter of the calling party number (here, the second phone number (302)) to a predetermined value to prevent the carrier (1500) from re-routing the call to the C-CTSS (1100) (during S540 for this example, the "P-Called-Party-ID is set to "+999999999"; any other predetermined value may be used). During S550, the carrier (1500) sends a "100 TRYING" message to the C-CTSS (1100). Once the P-Called-Party-ID is set to the predetermined value, the carrier (1500) can start calling and attempt to connect to the user (100) on the called party number (302). At this time, C-CTSS (1100) can start a connection setup for voice and data with the selected caption provider (1400). The connection procedure can use the UNI protocol or a propriety protocol such as Q.931, Q.2931, SIP, and the like. The connection procedure sets the path to transmit the voice information to the peer (200). The connection between the C-CTSS (1000) and the caption provider (1400) of the C-CTS can be connected/disconnected at any time and at any point by the user (100) through the TCP/IP connection between the user (100) and the C-CTSS (1100), the connection thereof being mediated by the C-CTSS (1100) as shown in FIGS. 6-7.

In the call setup procedure (S560-S580) the carrier (1500) attempts to establish a connection between the peer (200) of the second phone number (302) and the user (100) of the first phone number (301) (the C-CTS subscriber in this example). After the call setup procedure (S560-S580) is completed, the carrier (1500) sends a "C: 183 Session Progress" message to the C-CTSS (1100) in S590, this message may include ACM of the ISUP protocol. The C-CTSS (1100) transmits a "B: 183 Session Progress" message that includes ACM to the carrier (1500) for a call setup procedure between the C-CTSS (1100) and the peer (200). Once received by the carrier (1500), the carrier (1500) transmits an "A: 183 Session Progress" to the peer (200), as shown in S600, and the mobile communications device (1200) of the user (100) connects to the C-CTSS (1100) via TCP/IP to establish a transcription text data path, the data path shown in FIGS. 6-7. Alert messages may be passed from the carrier (1500) to the user's (100) mobile communications device (1200) in S610 and "200 OK" messages may be passed between the carrier (1500) and the C-CTSS (1100) during the call sessions when the captioning service from the caption provider (1400) is active as seen in S630. Thereafter, the mobile communications device (1200) of the user (100) connects with the carrier's (1500) mobile network (1510) as shown in S640 and the latter of which returns an connection acknowledgement message as shown in S650 to proceed with the call session with captioning as shown on the mobile communications device (1200) of the user (100) subscriber of the C-CTS.

The mobile communications device (1200) includes a user interface that is configured to display the captioned data from the user's caption provider (1400). The user interface includes selectable functions that permit the user (100) to set a preferred caption provider from a list of the plurality of caption providers (1400) displayed on the user interface and/or change the preferred caption provider to a new caption provider from the plurality of caption providers (1400) shown on the list. More specifically, selectable functions include functions that: save the received caption data during the call; toggle, on or off, displaying the received captioned data from at least one caption provider from the plurality of caption providers (1400); change the user's caption provider (1400) to one of the plurality of caption providers (1400); change a language; and change an automatic speech recognition ("ASR") engine or a caption agent ("CA") for the captioned telephone service. The ASR engine relates to machine voice recognition and captioning in contrast to the live-captioning performed by the caption agent.

The C-CTSS (1100) is further configured to monitor a quality of the captioned data received from the user's caption provider (1400) during the call; and change the user's caption provider (1400) to one of the plurality of caption providers (1400) when the quality of the captioned data received from the user's caption provider (1400) is below a predetermined threshold.

In an alternative embodiment, a C-CTS system ("C-CTSS") (1100) for providing a transcription service to a mobile communications device (1200) of a user (100) during a phone call between a first phone number (301) of the user (100) and a second phone number (302) of a peer (200), the C-CTSS (1100) including a database (1110) that stores the first phone number (301) of the user (100). In this embodiment, when the user (100) places a call using the first phone number (301) to the second phone number (302) of the peer (200), the C-CTSS (1100) is configured to: receive the call which is routed from the carrier (1500) of the first phone number (301); add or modify a call setup message parameter of the second phone number (302) during the call setup procedure to a predetermined value to prevent the carrier (1500) from re-routing the call to the C-CTSS (1100); and route the call to the carrier (1500) of the first phone number (301).

Upon receiving the call from the C-CTSS (1100) and checking the added or modified call setup parameter, the carrier (1500) of the first phone number (301) routes the call to the communications device (1300) of the second phone number (302).

For captioning, a user's caption provider (1400) from the plurality of caption providers (1400) communicates with the C-CTSS (1100) to provide the captioned telephone service of the user's caption provider (1400) to the user (100). The C-CTSS (1100) is further configured to transfer a voice of the peer (200) received from a communication device of the peer (200) to the user's caption provider (1400) and transfer a captioned data of the voice of the peer (200) received from the user's caption provider (1400) to a mobile communications device (1200) of the user (100).

When the peer (200) of the second phone number (302) places a return call directed to the first phone number (301) of the user (100) using a communications device (1300), the communications device (1300) of the peer (200) is connected to the carrier (1500) of the first phone number (301) and upon checking the first phone number (301), the carrier (1500) of the first phone number (301) is configured to route the return call to the C-CTSS (1100). In this scenario, the C-CTSS (1100) is further configured to: receive the return call from the carrier (1500) of the first phone number (301); add or modify a call setup message parameter; and route the return call to the carrier (1500) of the calling party number (301).

Upon receiving the return call from the C-CTSS (1100) and checking the added or modified call setup parameter, the carrier (1500) of the first phone number (301) routes the return call to mobile communications device (1200) of the first phone number (301). A user's caption provider (1400) from the plurality of caption providers (1400) communicates with the C-CTSS (1100) to provide the captioned telephone service of the user's caption provider (1400) to the user (100). Additionally, the C-CTSS (1100) is further configured to: transfer a voice of the peer (200) received from the communication device of the peer (200) to the user's caption provider (1400); transfer a captioned data of the voice of the peer (200) received from the user's caption provider (1400) to the mobile communications device (1200) of the user (100); monitor a quality of the captioned data received from the user's caption provider (1400) during the call; and change the user's caption provider (1400) to one of the plurality of caption providers (1400) when the quality of the captioned data received from the user's caption provider (1400) is below a predetermined threshold.

Similar to the previous embodiment disclosed above, the mobile communications device (1200) further includes a user interface that is configured to display the captioned data from the user's caption provider (1400). The user interface includes selectable functions that permit the user (100) to set a preferred caption provider from a list of the plurality of caption providers (1400) displayed on the user interface and/or change the preferred caption provider to a new caption provider from the plurality of caption providers (1400) shown on the list.

While the invention has been shown and described with reference to different embodiments thereof, it will be appreciated by those skilled in the art that variations in form, detail, compositions and operation may be made without departing from the spirit and scope of the invention as defined by accompanying claims.

What is claimed is:

1. A system for centralized captioned telephone service ("C-CTS"), the system comprising:
   a C-CTS system ("C-CTSS") for providing a transcription service to a user subscribed to the C-CTS during a phone call with a peer;
   a mobile communications device of the user which includes a first phone number assigned from a carrier of the user;
   a communications device of the peer which includes a second phone number; and
   a plurality of caption providers that communicate with the C-CTSS, wherein each of the caption providers provide a captioned telephone service,
   wherein the carrier of the first phone number includes a voice network, a data network, and a database that stores the first phone number of the user who is subscribed to the C-CTS, wherein the C-CTSS includes a database that stores the first phone number of the user,
   wherein the carrier of the first phone number is configured to route a call, which originated from the first phone number and is directed to the second phone number, to the C-CTSS, wherein the call includes a call setup message from the carrier, and
   wherein the C-CTSS is configured to:
      receive the call setup message from the carrier;
      add or modify a parameter of the call setup message to a predetermined value during a call setup procedure of the call to prevent the carrier from re-routing the call to the C-CTSS; and
      route the call to the carrier of the first phone number, upon receiving the call from the C-CTSS and checking the added or modified parameter, the carrier of the first phone number routes the call to the communications device of the second phone number.

2. The system of claim 1, wherein a user's caption provider from the plurality of caption providers communicates with the C-CTSS to provide the captioned telephone service of the user's caption provider to the user, and wherein the C-CTSS is further configured to transfer a voice of the peer received from the communication device of the peer to the user's caption provider and transfer a captioned data of the voice of the peer received from the user's caption provider to the mobile communication device of the user.

3. The system of claim 2, wherein the peer is subscribed to the C-CTS,
   wherein the second phone number is stored in the database of the C-CTSS,
   wherein a peer's caption provider from the plurality of caption providers communicates with the C-CTSS to provide the captioned telephone service of the peer's caption provider to the peer, and
   wherein the C-CTSS is further configured to transfer a voice of the user received from the mobile communications device of the user to the peer's caption provider and transfer a captioned data of the voice of the user received from the peer's caption provider to the communication device of the peer.

4. The system of claim 1, wherein, when the peer places a return call directed to the first phone number using the communications device, the communications device of the peer is connected to the carrier of the first phone number and upon checking the first phone number, the carrier of the first phone number is configured to route the return call to the C-CTSS,
   wherein the return call includes a return call setup message from the carrier of the first phone number, and wherein the C-CTSS is further configured to:
      receive the return call setup message from the carrier of the first phone number;
      add or modify a return call setup message parameter of the return call setup message; and
      route the return call to the carrier of the first phone number,
      upon receiving the return call from the C-CTSS and checking the added or modified return call setup message parameter, the carrier of the first phone number routes the return call to the mobile communications device of the first phone number.

5. The system of claim 4, wherein a user's caption provider from the plurality of caption providers communicates with the C-CTSS to provide the captioned telephone service of the user's caption provider to the user, and wherein the C-CTSS is further configured to transfer a voice of the peer received from the communication device of the peer to the user's caption provider and transfer a captioned data of the voice of the peer received from the user's caption provider to the mobile communication device of the user.

6. The system of claim 5, wherein the C-CTSS is further configured to:
connect to the user's caption provider via an internet protocol network; and
connect to the mobile communication device of the user via the data network.

7. The system of claim 6, wherein the mobile communications device further includes a user interface that is configured to display the captioned data from the user's caption provider.

8. The system of claim 7, wherein the user interface includes selectable functions that permit the user to set a preferred caption provider from a list of the plurality of caption providers displayed on the user interface or change the preferred caption provider to a new caption provider from the plurality of caption providers shown on the list.

9. The system of claim 7, wherein the user interface includes selectable functions that:
save the received caption data during the call;
toggle, on or off, displaying the received captioned data from at least one caption provider from the plurality of caption providers;
change the user's caption provider to one of the plurality of caption providers;
change a language; and
change an automatic speech recognition ("ASR") engine or a caption agent ("CA") for the captioned telephone service.

10. The system of claim 6, wherein the C-CTSS is further configured to:
monitor a quality of the captioned data received from the user's caption provider during the call; and
change the user's caption provider to one of the plurality of caption providers when the quality of the captioned data received from the user's caption provider is below a predetermined threshold.

11. A C-CTS system ("C-CTSS") for providing a transcription service to a mobile communications device of a user during a call between a first phone number of the user and a second phone number of a peer wherein the call includes a call setup message, the C-CTSS comprising:
a database that stores the first phone number of the user, wherein when the user places a call using the first phone number to the second number of the peer, the C-CTSS is configured to:
receive the call setup message which is routed from the carrier of the first phone number;
add or modify a parameter of the call setup message to a predetermined value during a call setup procedure of the call to prevent the carrier from re-routing the call to the C-CTSS; and
route the call to the carrier of the first phone number, upon receiving the call from the C-CTSS and checking the added or modified parameter, the carrier of the first phone number routes the call to the communications device of the second phone number.

12. The system of claim 11, wherein a user's caption provider from the plurality of caption providers communicates with the C-CTSS to provide the captioned telephone service of the user's caption provider to the user, and wherein the C-CTSS is further configured to transfer a voice of the peer received from a communication device of the peer to the user's caption provider and transfer a captioned data of the voice of the peer received from the user's caption provider to a mobile communication device of the user.

13. The system of claim 11, wherein, when the peer places a return call directed to the first phone number using a communications device, the communications device of the peer is connected to the carrier of the first phone number and, upon checking the first phone number, the carrier of the first phone number is configured to route the return call to the C-CTSS,
wherein the return call includes a return call setup message from the carrier of the first phone number, and wherein the C-CTSS is further configured to:
receive the return call setup message from the carrier of the first phone number;
add or modify a parameter of the return call setup message during a return call setup procedure of the return call to prevent the carrier from re-routing the return call to the C-CTSS; and
route the return call to the carrier of the first phone number,
upon receiving the return call from the C-CTSS and checking the added or modified parameter of the return call setup message, the carrier of the first phone number routes the return call to mobile communications device of the first phone number.

14. The system of claim 13, wherein a user's caption provider from the plurality of caption providers communicates with the C-CTSS to provide the captioned telephone service of the user's caption provider to the user, and wherein the C-CTSS is further configured to transfer a voice of the peer received from the communication device of the peer to the user's caption provider and transfer a captioned data of the voice of the peer received from the user's caption provider to the mobile communication device of the user.

15. The system of claim 14, wherein the mobile communications device further includes a user interface that is configured to display the captioned data from the user's caption provider, and
wherein the user interface includes selectable functions that permit the user to set a preferred caption provider from a list of the plurality of caption providers displayed on the user interface or change the preferred caption provider to a new caption provider from the plurality of caption providers shown on the list.

16. The system of claim 14, wherein the C-CTSS is further configured to:
monitor a quality of the captioned data received from the user's caption provider during the call; and
change the user's caption provider to one of the plurality of caption providers when the quality of the captioned data received from the user's caption provider is below a predetermined threshold.

* * * * *